United States Patent Office 2,866,723
Patented Dec. 30, 1958

2,866,723

PROCESS FOR MARKING HALOGENATED POLYMERS, AND RESULTING ARTICLE

Fred William West, Ridgefield, N. J., assignor, by mesne assignments, to Minnesota Mining and Manufacturing Company, St. Paul, Minn., a corporation of Delaware No Drawing. Application September 16, 1953
Serial No. 380,585

8 Claims. (Cl. 117—138.8)

This invention relates to halogen-containing plastics. In one of its more particular aspects, this invention relates to an ink for marking thermoplastic halogenated polymers. In another of its aspects, this invention relates to a process for applying ink to halogenated thermoplastic polymers. In one of its more particular aspects, this invention relates to an ink for marking plastic polymers of trifluorochloroethylene and tetrafluoroethylene and to a method of applying these inks.

Because of their unusual chemical and physical characteristics the fluorine-containing thermoplastic polymers are widely used in numerous industrial applications where their properties are best exploited. Among the most outstanding of the properties of the fluorine-containing thermoplastic polymers, such as polymers of trifluorochloroethylene, is chemical inertness. Thus, these polymers may be exposed to a wide variety of oxidizing, reducing and solvent-type reagents such as, fuming nitric acid, hydrazine, and aniline with no apparent effect on the polymer. In addition to their high degree of chemical stability, these polymers possess high thermal stability, excellent electrical properties and are readily molded into various useful items.

In many of the applications in which industrial users employ these plastic polymers, it is desirable and sometimes necessary that the polymer be marked or colored. Thus, in electrical insulation application where the polymer is used to insulate the individual conductors in a multi-conductor cable some method of color coding must be used. In addition, manufacturers frequently desire to apply trademarks or other indicia to their products. Although, there is available today, a wide variety of inks, none has been found which will satisfactorily mark the plastic polymers of trifluorochloroethylene and tetrafluoroethylene. Some ink formulations smudge on contact with the polymer while others chip or off-set after application.

It is an object of this invention to provide an ink composition which can be applied to halogen-containing plastics by a variety of marking processes.

It is another object of this invention to provide a resin base ink which can be used to permanently mark halogen-containing plastics.

It is another object of this invention to provide an ink which has good adhesive properties when applied to halogen-containing plastics and which sets at room temperature.

It is another object of this invention to provide an ink which is stable at high temperatures.

It is one of the more particular objects of this invention, to provide an ink composition which can be used to mark polymers of trifluorochloroethylene and tetrafluoroethylene.

Another object of this invention is to provide a new and improved ink composition.

Various other objects and advantages of the present invention will become apparent to those skilled in the art on reading the accompanying description and disclosure.

In general, the above objects are accomplished by applying to the surface that is to be marked, an ink which comprises a pigment admixed with a solution of a copolymer of trifluorochloroethylene in an oxygenated organic solvent.

The copolymers of trifluorochloroethylene which are used as pigment binders in the inks of this invention are normally solid, have softening points above about 150° C. and are soluble in oxygenated organic solvents. This group contemplates trifluorochloroethylene copolymerized with halogenated olefins such as vinyl chloride, vinylidene chloride, vinyl fluoride, vinylidene fluoride, 1,1-fluorochloroethylene and trifluoroethylene. A particularly suitable binder is a copolymer of trifluorochloroethylene and vinylidene chloride wherein trifluorochloroethylene is present in an amount between about 5 and about 95 mol percent. Preferably, the trifluorochloroethylene-vinylidene fluoride copolymers contain trifluorochloroethylene in an amount between about 20 and about 80 mol percent. Of course, the characteristics of the binder are dependent upon the mol concentration of trifluorochloroethylene. Thus, if between about 20 and about 69 mol percent of trifluorochloroethylene, preferably about 50 mol percent, is present, the binder will have properties characteristic of elastomeric materials, whereas if between above about 69 and about 80 mol percent of trifluorochloroethylene, preferably about 75 mol percent, is present, the binder will have the characteristics of a resinous material. In most applications, the preferred pigment binder is that which has resinous properties, that is a copolymer containing trifluorochloroethylene in an amount between above about 69 and about 80 mol percent.

Since the process of this invention relates to new and novel ink compositions, their preparation and use, unnecessarily detailed description of the methods of preparation of the binder is not warranted. Therefore, only methods of preparation of the preferred resinous and elastomeric binders are given although by employing substantially identical polymerization systems but with different monomer feed ratios and polymerization times any copolymer in the range contemplated by this invention may be prepared.

The preferred resinous binder may be prepared by the procedure given below using the following water-suspension type recipe.

| | Parts by weight |
|---|---|
| Water, distilled | 200. |
| $CF_2=CFCl$ | [1] 92.2 |
| $CF_2=CH_2$ | [1] 7.8 |
| $(NH_4)_2S_2O_8$ | 2.0 |
| $Na_2S_2O_5$ | 0.8 |
| $FeSO_4 \cdot 7H_2O$ | 0.2 |

[1] 86/14 molar.

Catalyst and activator solution was prepared by dissolving 2 parts of $(NH_4)_2S_2O_8$ in 20 parts of water. Next, 0.8 part of $Na_2S_2O_5$ were dissolved in another 20 parts of water. In still another 20 parts of water, 0.2 part of $FeSO_4 \cdot 7H_2O$ was dissolved. 140 parts of water were next charged to a silver-lined steel bomb. The aforementioned $(NH_4)_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C. over a period of 18 hours. The residual monomer was then vented from the bomb and a mixture of water and particles of resinous polymer were discharged. These particles were washed with hot water to remove residual salts, and were then dried in vacuo at room temperature. The mol percent of $CF_2=CFCl$, combined in the resulting copolymeric product was 75 percent.

The preferred elastomeric binder may be prepared using the following water-suspension type recipe.

| | Parts by weight |
|---|---|
| Water, distilled | 200. |
| $CF_2=CFCl$ | [1] 64.5 |
| $CF_2=CH_2$ | 35.5 |
| $K_2S_2O_8$ | 1.0 |
| $Na_2S_2O_5$ | 0.4 |
| $FeSO_4.7H_2O$ | 0.1 |

[1] 50/50 molar.

Catalyst and activator solution was prepared by dissolving 1 part of $K_2S_2O_8$ in 20 parts of water. In still another 20 parts of water, 0.1 part of $FeSO_4.7H_2O$ was dissolved. 140 parts of water were next charged to a silver-lined steel bomb. The aforementioned $K_2S_2O_8$, $Na_2S_2O_5$, and the $FeSO_4.7H_2O$ solutions were then added in succession. The contents of the bomb were frozen after each addition. The bomb was then closed and evacuated. Thereafter, 64.5 parts of $CF_2=CFCl$ and 35.5 parts of $CF_2=CH_2$ were flash-distilled into it. The bomb was then rocked at room temperature (between about 25° C. and about 35° C.) for a period of 24 hours. The residual monomer was then vented from the bomb and a mixture of water and chunks of rubbery polymer were discharged. These chunks were washed with hot water to remove residual salts, and were then dried in vacuo at room temperature. The mol percent of $CF_2=CFCl$ combined in the resulting copolymeric product was 49 percent.

In the formulation of the inks of this invention, any suitable dye, pigment or lake, may be used. The term pigment as used herein includes dyes, lakes and inorganic pigments. The pigment may be soluble or insoluble in the binder and if insoluble, it is preferably finely-divided and intimately dispersed within the binder. Generally, insoluble pigments are preferred since they are opaque, do not bleed and are more heat stable than the soluble pigments. However, in some instances the use of a soluble pigment might be advantageous, for example where a transparent mark or indicia is desired. Any colored pigment may be used, although usually organic compounds are preferred over inorganic compounds because their colors are more intense and, therefore, less is required. Illustrative of the pigments which may be employed are the various phthalocyanine, azo, anthraquinone, benzidine, and pyrazolone compounds and derivatives. A list of particularly suitable pigments is presented in the table below, but it is to be clearly understood that this list is representative and not unnecessarily limiting. These pigments are substantially insoluble in the solvent and the binder.

TABLE

| | Common Name [1] | Reference to Structure [1] | Chemical Name | General Structure |
|---|---|---|---|---|
| (1) | Phthalocyanine Blue | Karrer's Organic Chemistry Pgs. 788-789, 4th Edition. | Copper-phthalocyanine | Phthalocyanine pigment. |
| (2) | Phthalocyanine Green | Karrer's Organic Chemistry Pgs. 788-789, 4th Edition. | Chlorinated Copper-phthalocyanine. | Do. |
| (3) | Phthalocyanine Green | Karrer's Organic Chemistry Pgs. 788-789, 4th Edition. | Highly chlorinated Copper-phthalocyanine. | Do. |
| (4) | Benzidine Yellow Toner | Fig. 49, P. 391 | o-dichlorobenzidine bis alpha-(azo o-methyl alpha-acetoacetanilide). | Substituted benzidine acetanilide azo pigment. |
| (5) | do | Fig. 48, P. 391 | o-dichlorobenzidine bis alpha-(azo alpha-acetoacetanilide). | Do. |
| (6) | do | Fig. 50, P. 392 | o-dichlorobenzidine bis alpha-(azo o, p-dimethyl-alpha-acetoacetanilide). | Do. |
| (7) | Dianisidine Orange Toner | Fig. 60, P. 397 | o-dianisidine bis alpha-(azo o-methyl-alpha acetoacetanilide). | Do. |
| (8) | do | Fig. 61, P. 397 | o-dianisidine bis alpha-(azo o, p-dimethyl alpha-acetoacetanilide). | Do. |
| (9) | do | Fig. 62, P. 398 | o-dianisidine bis alpha-(azo alpha-acetoacetanilide). | Substituted benzidine acetoanilide azo pigment. |
| (10) | Lithosal Red 2-B | Fig. 91, P. 412 | Calcium salt of 2-hydroxy-3-carboxy - 1 - naphthylazo ortho - (p-chloro-m-toluene sulfonic acid). | Phenyl-naphthyl azo pigment. |
| (11) | Benzidine Orange Toner | Fig. 51, P. 392 | o-dichlorobenzidine bis 4-(azo-1-phenyl-3-methyl pyrazolone). | Substituted benzidine-pyrazolone azo pigment. |
| (12) | Vulcan Fast Red BA | Fig. 81, P. 407 | o-dichlorobenzidine bis 4-(azo-1-phenyl-3-ethyl carboxylate-pyrazolone). | Do. |
| (13) | Vulcan Fast Red G | Fig. 80, P. 407 | o-dianisidine bis 4-(azo 1 - p - tolyl - 3 - methyl - pyrazolone). | Do. |
| (14) | Permanent Red F-4RH | Fig. 77, P. 405 | 1 - (p chloro - o - tolyl azo)- 2 - naphthol 3 - amido - n - (p - chloro-o-methyl benzene). | Substituted phenyl-naphthyl-toluidine azo pigment. |
| (15) | Permanent Red F 4R | Fig. 76, P. 405 | Ring structure similar to that of pigment (14). | Do. |
| (16) | Chloronitroaniline Red Toner. | Fig. 75, P. 404 | do | Do. |
| (17) | Nitroaniline Red Toner | Fig. 73, P. 403 | do | Do. |
| (18) | Toluidine Maroon Toner | Fig. 82, P. 408 | do | Do. |
| (19) | Nitroanisidine Maroon Toner. | Fig. 84, P. 409 | do | Do. |
| (20) | Indanthrene Blue | Karrer's Organic Chemistry, P. 401, 4th Edition. | N-N'-dihydro-1, 2, 1', 2'-dianthraquinone phenazine. | Dianthraquinone dye. |
| (21) | Indanthrene Orange RRTA. | Fig. 126, P. 430 | | Bromo-anthraquinone dye. |

[1] Unless otherwise indicated, references to structure may be found in J. J. Mattiello, Protective and Decorative Coatings, v. 5, chapter 4 (John Wiley and Sons, 1946).

Representative of the soluble pigments which may be employed are the various indigo dyes such as Ciba Yellow 3G, Brilliant Indigo 4B, Ciba Green G, Ciba Violet A, Helindon Orange R, etc. the Alizarine dyes such as Alizarine Cyanine Green, Alizarine Blue, Alizarine Orange and the quinoline dyes such as Chinoline Yellow. These dyes are described and methods of preparation are given in Organic Chemistry Fieser and Fieser, second edition, pages 907, 910–912 and 916–918.

In employing the inks of this invention, the binder is preferably dissolved in a solvent. Suitable solvents or thinners are the oxygenated organic solvents in some of which the binder is completely soluble, while in others it is partially soluble. Thus, the binder is completely soluble in tetrahydrofuran, tetrahydro-2-methyl furan, tetrahydropyran, 3-chlorotetrahydrofuran and dioxane. Among the solvents in which the binder is partially soluble are ethyl acetate, isobutyl propionate, amyl acetate, methyl ethyl ketone, isophorone, di-isobutyl ketone, cyclohexanone, mesityl oxide, 1-chloro 1-nitroethane and 2-chloro 2-nitropropane. These latter solvents when mixed with a solvent in which the binder is completely soluble, will form a solvent mixture which will completely dissolve the binder. The use of solvent mixtures is desirable in order to control drying rate. A particularly suitable solvent is tetrahydrofuran; a particularly suitable mixture is tetrahydrofuran and dioxane. Preferably equal amounts by volume of each solvent constitute the mixture although the solvent in which the binder is completely soluble may constitute from about 25 percent to about 95 percent of the mixture.

In compounding the inks of this invention, the binder is preferably first dissolved in a suitable solvent such as tetrahydrofuran after which the pigment is admixed with the dissolved binder. Admixture of the pigment with the dissolved binder may be effected by using any of the conventional mixing and blending equipment such as a three roll paint mill, colloid mill, and pebble mill, etc. The range of concentration of the various ingredients of the ink will vary over relatively wide limits depending upon the desired thickness of the ink mark, the intensity of color and the method by which the ink is to be applied. Generally, the ratio of binder to pigment will be between about 20:1 and about 1:2. Preferably, the ratio will be between about 10:1 and about 1:1 while a particularly suitable ratio is between about 4:1 and about 1:1. The solvent or thinner is used in an amount between about 25% and about 99% by weight, depending particularly on the process which is to be used in applying the ink. A particularly suitable concentration of solvent is between about 50 and about 95%. Obviously, a solvent is required where the marking process is based on the use of liquids. However, some marking processes are best suited to the use of solid marking compositions, for example, the hot stamp process. In this case a solvent free pigmented film from 1 to 5 mils thick may be used as the marking composition.

The copolymers which serve as a binder for the ink of this invention may be treated in such a way as to induce cross-linking of the polymer chain after the ink has been applied. This cross-linking modifies the properties of the copolymer and enhances its suitability for use in certain applications. The cross-linked polymers are usually insoluble but may swell in solvent, have increased strength, toughness, heat resistance, less tendency to offset and greater chemical resistance. Generally, cross-linking of the copolymeric binders which are used in the inks of this invention, is effected by incorporating within the copolymer a cross-linking agent which may be a peroxy-type compound, a basic metal oxide or an inorganic polysulfide. The peroxy-type compounds include both organic and inorganic compounds which contain oxygen atoms directly linked to oxygen atoms, and should be stable below about 50° C. or else they will cause cross-linking while they are being blended into the copolymer. Among the organic compounds are the acyl and acyl peroxides and hydroperoxides such as ditertiary butyl peroxide, di-lauryl peroxide, di-benzol peroxide, and ditertiary butyl hydroperoxide. The organic peroxy-type compounds also include peresters having either organic or inorganic peroxy oxygen. The former would include such compounds as alkyl, aryl perbenzoates, the latter would include alkyl and aryl persulfates. Among the inorganic peroxy compounds are hydrogen peroxide and metal peroxides, such as lead, barium, and zinc peroxide. Among the basic oxides which may be used as linking agents are magnesium oxide, zinc oxide, and lead oxide. Among the inorganic polysulfides which may be used are the alkali metal polysulfides and ammonium polysulfides. In order to effect the cross-linking reaction, it is necessary that the polymer containing cross-linking agent be heated for a period of time. Generally, the polymer is heated at a temperature between about 100° and about 200° C., depending upon the decomposition temperature of the cross-linking agent, for a period of time between about 1 hour and about 48 hours. Since the incorporation of the cross-linking agent within the copolymer is usually effected by mechanical means which generate heat, the cross-linking agent is preferably added last, that is, after the pigment has been dispersed. A particularly valuable cross-linking reaction employing diamines, such as ethylene diamine, diethylene triamine, hexamethylene diamine, diamino stilbene etc., is described in my prior and copending application Serial No. 372,159, filed August 3, 1953, now U. S. Patent No. 2,793,200, issued May 21, 1957.

The use of polytrifluorochloroethylene oils as a base for preparing concentrate pigment dispersions is also within the scope of this invention. These oils are prepared by the methods disclosed in U. S. Patent No. 2,639,907 to William T. Miller, issued April 28, 1953. In this connection the pigment is dispersed in the oil in a highly concentrated amount, that is, in an amount between about 50 and about 75% by weight. The pigmented oil is subsequently added to the clear resin solution in an amount sufficient to yield the desired binder pigment ratio.

In order to illustrate the process of this invention, the following examples of ink formulations are presented below. These inks were prepared by admixing the indicated pigment in the resin solution in a pebble mill. In each case the binder was a 75/25 copolymer of trifluorochloroethylene and vinylidene fluoride. Unless otherwise indicated concentration is given in parts by weight. These data are offered for purposes of illustration and are not to be construed as unnecessarily limiting.

*Ink formulations*

| Resin or Copolymer Binder | 8 | 3 | 18 | 20 | 12 | 27 | 20 | 20 | 17 | 10 | 8 | 4 | 19 | 10 | 15 | 8 | 10 | 5 | 8 | 10 | 20 | 20 | 20 | |
|---|---|---|---|---|---|---|---|---|---|---|---|---|---|---|---|---|---|---|---|---|---|---|---|---|
| Vulcan Fast Red G | 3 | 1 | 6 | | | | | | 7 | 10 | | | | | | | | 1.5 | | 10 | | 5 | | |
| Permanent Red 4 FRH | | | | | | | | | | | 6 | 3 | 2 | | 15 | 6.5 | | | | | | | | |
| Phthalocyanine Green | | | | 5 | 3 | 15 | 10 | 5 | | | | | | 3 | | | 2.5 | | | | | | | |
| Phthalocyanine Blue | | | | | | | | | | | | | | | | | | | 2.5 | | | | 5 | |
| Benzidine Yellow | | | | | | | | | | | | | | | | | | | | | 5 | | | |
| Tetrahydrofuran | 39 | 40 | 60 | 50 | 57 | 40 | | | 59 | 55 | 18 | 9 | 57 | 30 | 35 | 18 | 60 | 60 | 39.5 | 55 | 50 | 60 | 50 | |
| Dioxane | | 37 | 16 | 25 | 28 | 18 | 35 | 37.5 | 17 | 25 | 18 | 9 | 15 | | 35 | 17.5 | 37.5 | | | 25 | 25 | 15 | 25 | |
| Di-isobutyl Ketone | 50 | 19 | | | | | | | | | | | 7 | 57 | | | | 33.5 | 50 | | | | | |
| Methylethyl Ketone | | | | | | | | | | | | | | | | | | | | | | | | |
| Ethylbutyl Ketone | | | | | | | | | | | 50 | 25 | | | | | | | | | | | | |
| Amyl Acetate | | | | | | | | | | | | 50 | | | | 50 | | | | | | | | |
| Ink # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

Ink Nos. 1 through 5 and 17 were applied to a wire coated with a thermoplastic homopolymer of trifluorochloroethylene using an Entwhistle wire striper. Ink Nos. 3 and 4 represent concentrated inks which were thinned with dioxane prior to use by adding a quantity of dioxane sufficient to raise the concentration of dioxane to about 58 parts. Ink Nos. 6 and 15 were applied using a silk screen technique. Ink Nos. 7 through 14 and 18 were applied by stamping on films of a homopolymer of trifluorochloroethylene. Ink No. 16 was applied by a stenciling technique. Inks Nos. 19 and 21 were applied to sheets of tetrafluoroethylene. As was indicated above, these inks can be blended with a quantity of a liquid polymer of trifluorochloroethylene as shown by ink No. 20 which contained 1 part of such oil in addition to the other enumerated constituents.

Each of the above inked surfaces was carefully examined with respect to its adhesive characteristics, its resistance to abrasion and the clarity of the ink mark. Each of the inks so examined were found to be excellent in all respects. Examination was made by fixing adhesive Scotch tape over the ink mark and then quickly removing the Scotch tape and noting whether or not any of the ink adhered to the tape. Abrasion resistance was determined by rubbing the marked surface with a pencil eraser and with a coarse cloth. Examination of cross-sections of the ink mark established that the mark firmly adhered to the surface of the marked article and did not penetrate the surface. Each of the above inks was applied at room temperature and was force dried by heating at about 110° C. Since the ink dries by evaporation of the solvent, the ink may be applied and allowed to dry at room temperature although it is also possible and sometimes preferable to accelerate the drying of the ink by heating at slightly elevated temperatures, that is, temperature up to about 150° C. In the event that the binder is to be cross-linked heating is of course required.

As was indicated above, the viscosity of the inks of this invention may be modified by varying the concentration of the resin or the solvent. However, at times it will be desirable, particularly where thexotropic inks are required, to add a thickening agent, such as bentonite clay, silica, etc. When this type of material is used it is usually added in an amount sufficient to obtain the desired characteristics. However, it is preferred to add not more than about 20 percent and preferably less than about 10 percent.

While the inks of this invention are particularly suited for marking polymers of trifluorochloroethylene and tetrafluoroethylene and while the use of these inks has been described with particular reference thereto, it is to be understood and is, therefore, within the scope of this invention that these inks may also be applied to polymers of vinyl chloride, vinylidene chloride, vinyl fluoride or, in general, to any solid thermoplastic halogenated polymer.

Various alterations and modifications of the invention and its aspects may become apparent to those skilled in the art without departing from the scope of this invention.

Having thus described my invention, I claim:

1. A process for marking halogenated polymers which comprises applying to the surface that is to be marked an ink which comprises an admixture of an insoluble organic pigment and a solution in a volatile oxygenated organic solvent of a normally solid copolymer containing between about 20 and about 80 mol percent of trifluorochloroethylene copolymerized with vinylidene fluoride.

2. A process for marking halogenated polymers which comprises applying to the surface that is to be marked an ink which comprises an admixture of an insoluble organic pigment and a solution in a volatile oxygenated organic solvent of a normally solid copolymer containing between about 20 and about 69 mol percent of trifluorochloroethylene copolymerized with vinylidene fluoride.

3. A process for marking halogenated polymers which comprises applying to the surface that is to be marked an ink which comprises an admixture of an insoluble organic pigment and a solution in a volatile oxygenated organic solvent of a normally solid copolymer containing between above about 69 and about 80 mol percent of trifluorochloroethylene copolymerized with vinylidene fluoride.

4. A solid polymer of a halogenated olefin surface which is marked with a marking composition comprising an insoluble organic pigment and a copolymer containing between about 20 and about 69 mol percent of trifluorochloroethylene copolymerized with vinylidene fluoride.

5. A solid polymer of trifluorochloroethylene which is marked with a marking composition comprising an insoluble organic pigment and a copolymer containing between about 20 and about 80 mol percent of trifluorochloroethylene copolymerized with vinylidene fluoride.

6. A solid polymer of tetrafluoroethylene which is marked with a marking composition comprising an insoluble organic pigment and a copolymer containing between about 20 and about 80 mol percent of trifluorochloroethylene copolymerized with vinylidene fluoride.

7. A solid polymer of a halogenated olefin surface which is marked with a marking composition comprising an insoluble organic pigment and a copolymer containing between above about 69 and about 80 mol percent of trifluorochloroethylene copolymerized with vinylidene fluoride.

8. A solid polymer of a halogenated olefin surface which is marked with a marking composition comprising an insoluble organic pigment and a copolymer containing between about 20 and about 80 mol percent of trifluorochloroethylene copolymerized with vinylidene fluoride.

References Cited in the file of this patent

UNITED STATES PATENTS

| | | |
|---|---|---|
| 2,618,574 | Pavlic | Nov. 18, 1952 |
| 2,656,331 | Sprung | Oct. 20, 1953 |
| 2,686,738 | Teeters | Aug. 17, 1954 |
| 2,752,331 | Dittman et al. | June 26, 1956 |

FOREIGN PATENTS

| | | |
|---|---|---|
| 593,605 | Great Britain | Oct. 1, 1947 |